(No Model.)

J. A. MONCRIEF.
FRICTION CLUTCH.

No. 447,967. Patented Mar. 10, 1891.

WITNESSES:
Henry J. Miller
Chas. H. Luther Jr.

INVENTOR:
James A. Moncrief
by Joseph A. Miller & Co.
Attys.

THE NORRIS PETERS CO., PHOTO-LITHO., WASHINGTON, D. C.

UNITED STATES PATENT OFFICE.

JAMES A. MONCRIEF, OF PAWTUCKET, RHODE ISLAND.

FRICTION-CLUTCH.

SPECIFICATION forming part of Letters Patent No. 447,967, dated March 10, 1891.

Application filed November 28, 1890. Serial No. 372,823. (No model.)

*To all whom it may concern:*

Be it known that I, JAMES A. MONCRIEF, of the city of Pawtucket, in the county of Providence and State of Rhode Island, have invented a new and useful Improvement in Friction-Clutches, of which the following is a full, clear, and exact description, reference being had to the accompanying drawings, forming part of this specification.

This invention has reference to a friction-clutch which will produce a comparatively gradual transmission of motion from one shaft to another, in order to prevent the shock caused by the sudden starting of the machinery. To this end I have combined certain novel features of construction and arrangement of parts, as will be more fully set forth hereinafter, and pointed out in the claims.

Figure 1:
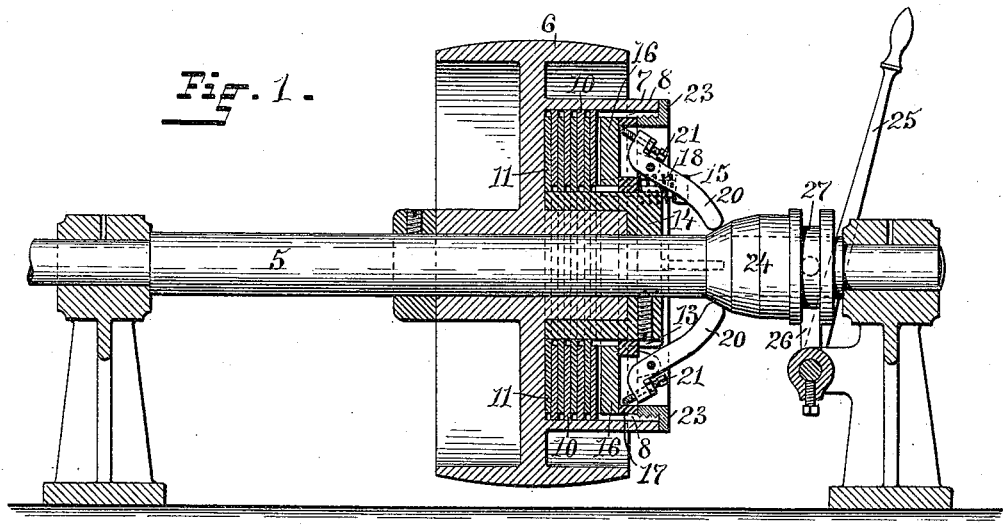
Figure 2:
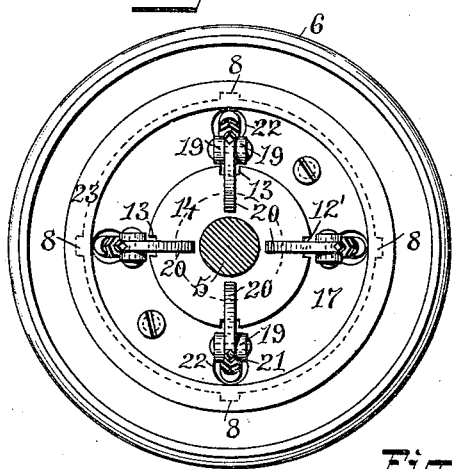
Figure 3:
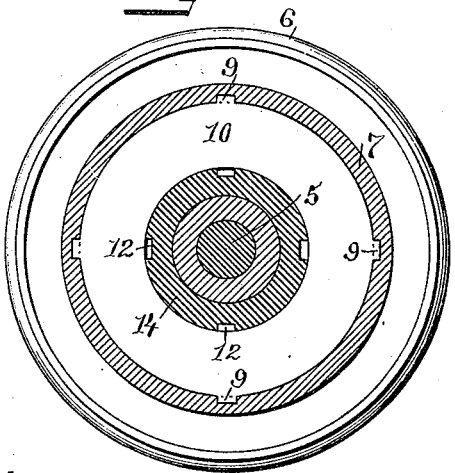
Figure 4:
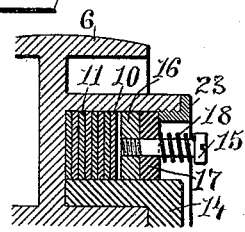

Figure 1 is a view of the improved clutch, shown partly in section, and the shaft on which the pulley and clutch are supported. Fig. 2 is an end view of the clutch. Fig. 3 is a view of the same, partly in section, with the face-plate removed. Fig. 4 is a sectional view of a part of the clutch and pulley, showing the releasing mechanism.

Similar numbers of reference designate corresponding parts throughout.

In the drawings, the number 5 indicates a shaft upon which the loose pulley 6 rotates when released from the clutch. This pulley 6 is provided with an inner flange 7, which has longitudinal slots 8, in which the projections 9 on the outer circumference of the plates 10 are free to slide longitudinally, but must revolve with the pulley. The plates 11 are placed alternately between the plates 10, and are each furnished with the projections 12, formed on their inner circumference, to engage in the longitudinal slots 13 cut in the outer surface of the sleeve 14, which is secured to the shaft 5 in the usual manner.

The bolts 15 are secured to the following plate 16, which moves loosely on the sleeve 14. These bolts slide freely through holes in the face-plate 17, which forms a bearing for the springs 18, which encircle the bolts. The face-plate 17 is provided with projections 12', which enter the longitudinal slots 13 of the sleeve 14, and has studs 19 arranged in pairs and between each pair of studs a lever 20 is hinged, the bent ends of the levers being furnished with the set-screws 21. The ends of the set-screws 21 pass through the holes 22 in the face-plate 17 and bear against the following plate 16.

The plates of the clutch are held in place in the flange 7 by the ring 23, which is screwed by its screw-thread to the inner edge of the flange.

A cone 24 is loosely fitted to the shaft 5 and is moved longitudinally by the shipper-lever 25 and pin 26, fitting in the slot 27.

The operation of the improved friction-clutch is very simple, the movement of the shipper-lever 25 forward pushes the cone 24 against the lever 19, the outer ends of which, riding over the surface of the cone, separate and thrust the ends of the set-screws 21 against the following plate 16, gradually forcing this plate against the outer plate 10 and pressing the plates 10 and 11 together until sufficient friction has been caused between the plates 10 and 11 to rotate the pulley and start the machinery connected therewith.

The friction-clutch is released by moving the shipper-lever backward, thus carrying the cone 24 away from its contact with the levers 20 and removing the pressure exerted by the set-screws 21 on the following plate 16 and allowing the springs 18 to act, which force the ends of the bolts 15 outward, thus drawing the following plate 16 away from the friction-plates 10 and 11, and permitting the plates 11 of the clutch to move independently of the plates 10, secured to the flange of the pulley.

By the construction described I am able to produce a very efficient form of friction-clutch without shortening the bearing of the pulley on the shaft.

Having thus described my invention, I claim as new and desire to secure by Letters Patent—

1. In a friction-clutch, a following plate fitting loosely over a sleeve and arranged to be forced inward by levers pivotally secured to the face-plate, and provided with set-screws bearing on the following plate to press the friction-plates together, and to be released from contact with the friction-plates by springs carried on bolts secured to the following plate, as described.

2. In a friction-clutch, the combination, with the levers 20, hinged to studs on the face-plate 17 and provided with the set-screws 21, which pass through holes 22 in the face-plate, of the following plate 16 and friction-plates 10 and 11, as described.

JAMES A. MONCRIEF.

Witnesses:
HENRY J. MILLER,
JOSEPH A. MILLER, Jr.